United States Patent [19]

Tanaka

[11] Patent Number: 5,732,264
[45] Date of Patent: Mar. 24, 1998

[54] INFORMATION MANAGEMENT SYSTEM AND METHOD FOR MANAGING, PROCESSING STORING AND DISPLAYING ATTRIBUTE INFORMATION OF OBJECT INFORMATION

[75] Inventor: Yoshiaki Tanaka, Neyagawa, Japan

[73] Assignee: Matsushita Electric Industrial Co., Ltd., Osaka-fu, Japan

[21] Appl. No.: 549,398

[22] Filed: Oct. 27, 1995

[30] Foreign Application Priority Data

Nov. 8, 1994 [JP] Japan .................................. 6-273874

[51] Int. Cl.$^6$ ................................................ G06F 17/30
[52] U.S. Cl. ....................... 395/615; 395/604; 395/961; 395/964
[58] Field of Search .................... 395/613, 614, 395/615, 611, 612, 961, 964, 603, 604; 364/468.01, 468.04

[56] References Cited

U.S. PATENT DOCUMENTS

| | | |
|---|---|---|
| 4,829,453 | 5/1989 | Katsuta et al. .................. 364/521 |
| 4,885,694 | 12/1989 | Pray et al. .................. 364/464.01 |
| 5,454,073 | 9/1995 | Fukushima et al. .................. 395/158 |
| 5,553,277 | 9/1996 | Hirano et al. .................. 395/600 |
| 5,568,566 | 10/1996 | Hori et al. .................. 382/197 |

*Primary Examiner*—Thomas G. Black
*Assistant Examiner*—Donald Min
*Attorney, Agent, or Firm*—Wenderoth, Lind & Ponack

[57] ABSTRACT

An information management system includes a management information database for managing attribute information of object information, an object information database having an information processing area and an information storing area for managing the object information, and a display and processing device for processing the object information while displaying the information, wherein the attribute information of the object information is made and stored in the management information database when the object information is made and processed at the information processing area, so that the object information is accessed by using the attribute information stored in the management information database.

14 Claims, 14 Drawing Sheets

Fig.5

SETTING OF TITLE COLUMN | DRAWING NUMBER

DRAWING NUMBER : KX

SECTION
X STANDARD EQUIPMENT
0 WORKING PLACE A
1 WORKING PLACE B
2 WORKING PLACE C

DRAWING NUMBER :
  SECTION :
  SUBSECTION :
  CLASS :
  SUBCLASS :
DRAWING NAME :
SIZE :
SCALE :
DESIGNER :
DRAFTSMAN :
DESIGNING DATE :
DRAWING DATE :
CHANGE HISTORY :
DESIGN STANDARD :
MATERIAL STANDARD :
CALCULATION DATA :
MATERIAL :
SURFACE TREATMENT :
PROCESS GROUP :

( MANY COMPONENTS IN ONE SHEET )

( REGISTRATION OF CHILD DRAWING NUMBER )

Fig.6

| (1) | (2) | (3) | (4) | (5) | (6) | (7) | (8) | (9) | (10) | (11) | (12) |
|---|---|---|---|---|---|---|---|---|---|---|---|
| SECTION | SUBSECTION | CLASS | SUBCLASS | RANK (SIZE) | CONSECUTIVE NUMBER | | | HISTORY SYMBOL | SPARE | | |

Fig.7

| REGISTRATION OF CHILD DRAWING NUMBER |
|---|

PARENT DRAWING NUMBER : ———————
CHILD DRAWING NUMBER : ———————
QUANTITY : ———————
REMARKS : ———————

CHILD DRAWING NUMBER   QUANTITY   REMARKS (ADDITION)  (DELETION)

Fig.8

SOME COMPONENTS IN ONE SHEET

DRAWING NUMBER : ☐

CALCULATED MASS : ☐
MATERIAL : ☐
SURFACE TREATMENT : ☐
PROCESS GROUP : ☐

SECTION : ___
SUBSECTION : ___
CLASS : ___
SUBCLASS : ___

DRAWING NUMBER
◁ ○ ▷

( ADDITION )  ( DELETION )

Fig.9

| INPUTTING OF QUERY CONDITIONS | |
|---|---|
| DRAWING NUMBER : | ☐ |
| SECTION : | ☐ |
| SUBSECTION : | ☐ |
| CLASS : | ☐ |
| SUBCLASS : | ☐ |
| DRAWING NAME : | ☐ |
| DESIGNER : | ☐ |
| DESIGNING DATE : | ☐ |
| DRAFTSMAN : | ☐ |
| DRAWING DATE : | ☐ |
| DRAWING CHECKER : | ☐ |
| CHECKING DATE : | ☐ |
| APPROVER : | ☐ |
| APPROVING DATE : | ☐ |

Fig.10

LIST OF QUERIED DRAWING

| DRAWING NUMBER | DRAWING NAME |
|---|---|
| F x x x x x · · · · · z | x x x x x |
| F x x x x x · · · · · z | |

◁ ○ ▷

DRAWING NUMBER :
DRAWING :
NAME OF TYPE OF MACHINE :
SIZE :
SCALE :
DESIGNER :
DRAFTSMAN :
DRAWING CHECKER :
APPROVER :
MATERIAL :
SURFACE TREATMENT :

PREVIEW

RE-QUERY

SOME COMPONENTS IN ONE SHEET

CHANGE HISTORY

PARENT- CHILD RELATIONSHIP

LIST OF PARENT DRAWING NUMBERS

USE RELATIONSHIP

Fig.11A

| DRAWING NUMBER | DRAWING NAME |
|---|---|
| F x x x ‥‥ z | |
| F x x x ‥‥ z | |
| F x x x ‥‥ z | |
| F x x x ‥‥ z | |
| F x x x ‥‥ z | |
| F x x x ‥‥ z | |
| F x x x ‥‥ z | |
| F x x x ‥‥ z | |
| F x x x ‥‥ z | |

PARENT—CHILD RELATIONSHIP

DRAWING NUMBER :
DRAWING :
NAME OF TYPE OF MACHINE :
SIZE :
SCALE :
DESIGNER :
DRAFTSMAN :
DRAWING CHECKER :
APPROVER :
MATERIAL :
SURFACE TREATMENT :

| CHANGE HISTORY |
|---|

DRAWING NUMBER : ———
CORRECTOR : ———
CORRECTING DATE : ———
CORRECTION REASON : ———

CHECKER OF CORRECTION : ———
APPROVER OF CORRECTION : ———

[PRECEDING]  [SUCCEEDING]   [LATEST HISTORY]

*Fig.13*

| SOME COMPONENTS IN ONE SHEET |
|---|

DRAWING NUMBER : ———

COMPONENT NUMBER :
NAME :
MATERIAL :
TREATMENT / PROCESS :
QUANTITY :
ARTICLE :

LIST OF QUERIED DRAWING

| DRAWING NUMBER | NAME | DATE |
|---|---|---|
| #B123456 | BOLT | |
| #B123457 | BOLT | |
| #B123458 | BOLT | |
| #B123459 | BOLT | |
| #B123460 | BOLT | |
| #B123461 | BOLT | |
| #B123462 | BOLT | |
| #B123463 | BOLT | |
| #C123456 | NUT | |
| #C123457 | NUT | |
| #C123458 | NUT | |
| #C123459 | NUT | |
| #C123460 | NUT | |
| #C123461 | NUT | |

SPECIAL RELATIONSHIP

DRAWING NUMBER : #B123460

B123400

1995/3/22

ORIGINAL DRAWING FOR USE
ORIGINAL DRAWING FOR REFERENCE
DIFFERENT COLOR

END

PREVIEW | RE-QUERY | SOME COMPONENTS IN ONE SHEET | CHANGE HISTORY

SPECIAL RELATIONSHIP | PARENT-CHILD RELATIONSHIP | LIST OF PARENT DRAWING NUMBERS | USE RELATIONSHIP

INFORMATION MANAGEMENT SYSTEM AND METHOD FOR MANAGING, PROCESSING STORING AND DISPLAYING ATTRIBUTE INFORMATION OF OBJECT INFORMATION

BACKGROUND OF THE INVENTION

The present invention generally relates to an information management system and method, and more particularly to an information management system and method suitably applied to information containing a large amount of data to be frequently processed, for example, drawings and the like which are to be frequently newly made, and frequently used (diversified), changed, queried, referred to, etc. after newly made.

According to a conventional system for management of drawings, designers and draftsmen suitably divide the drawing work and prepared drawings are classified in groups for every product or for every unit of components of the products, recorded in a register with respective numbers attached and finally stored in a storehouse.

In order to refer to a drawing of an existing product, use the existing drawing to make a drawing, or change the design of a product to make a drawing while using the existing drawing of the product, when the drawing of the existing product is accessed, people query the register, or if a list of drawings or the like is made for every existing product or every unit of components of the existing product when the product is designed, people search for such a list, and thereafter, the required drawing is specified from the register or list and taken out from the storehouse.

Recently, for the purpose of designing and drawing, many drawings are made by a CAD system. Although the drawings, the register of the drawings, or the list of the drawings per product are electronically managed individually in the CAD system, the management principle is the same as above.

The above-described conventional type of management system for drawings requires much time to query a target drawing when referring to a drawing of an existing product, using the existing drawing to make a drawing, or changing the design of a product to make a drawing while using the existing drawing of the product is performed. As a result, working efficiency at the designing time and drawing time is disadvantageously low.

When the system is arranged to manage drawings by utilizing a computer to make access to a desired drawing easily in a short time by means of an attached number, prepared drawings should be classified for components of similar purpose or similar function, etc. and thereafter, numbers should be attached to the drawings based on the classification beforehand, that is, a table of classification codes should be prepared beforehand. A number of the target drawing is selected while referring to the table of classification codes. Not only attaching of the numbers is troublesome, but the attached numbers cannot be used suitably and uniformly among people, and eventually not effectively used.

When only management information which manages drawings is displayed on a display screen, the technical content of each drawing cannot be accurately identified. On the other hand, when every drawing is displayed on the display screen, it takes much time to display the drawings due to a large quantity of data. It is impossible to quickly query a necessary drawing among the displayed drawings, resulting in a poor operability.

When the design of a product is changed, a drawing which is made by using a drawing where the design is drawn is influenced by the change of the design. Conventionally, a drawing having such an influence is found by relying on a designer's memory alone and then, it takes much time to find the drawing having such an influence and it is possible to not find such a drawing.

Further, if the design of a product for development is done by a plurality of designers and draftsmen, how far each person makes progress in designing cannot be confirmed in real time, and a designing time cannot be shortened because simultaneous advancement in designing by a plurality of designers and draftsmen is inexecutabe.

According to the management system described earlier whereby the drawings are classified with attached numbers for every component of similar purpose or function so as to increase sharing of components and a range of utility of drawings, it is impossible to recognize a relationship between a parent drawing and partial drawings constituting the parent drawing, and therefore a separate database is needed to manage the parent and partial drawings.

When one sheet of drawing contains a plurality of components, or in contrast, when one component is drawn on separate sheets of drawing, the drawings cannot be managed correspondingly to the component(s) and, in the former case, it is impossible to manage the history of each component, for instance, when the design is changed.

SUMMARY OF THE INVENTION

The object of the present invention is therefore to provide an information management system and method which enable easy and quick access to information containing a large quantity of data to be frequently processed, e.g., to which making a new drawing, using the existing drawing to make a drawing, changing the design of a product to make a drawing while using the existing drawing of the product, querying the drawings, and/or referring to the drawings are frequently performed, and moreover which achieve easy and suitable management of various kinds of information.

In accomplishing these and other objects, according to one aspect of the present invention, there is provided an information management system comprising:

a management information database for managing attribute information of object information;

an object information database having an information processing area and an information storing area for managing the object information; and a display and processing device for processing the object information while displaying the information, wherein the attribute information of the object information is made and stored in the management information database when the object information is made and processed at the information processing area, so that the object information is accessed by using the attribute information stored in the management information database.

According to another aspect of the present invention, there is provided an information management method which is used in an information management system comprising:

a management information database for managing attribute information of object information;

an object information database having an information processing area and an information storing area for managing the object information; and a display and processing device for processing the object information while displaying the information, the method comprising steps of:

making and processing the object information at the information processing area;

making the attribute information of the object information and storing the attribute information in the management information database at the making and processing step; and accessing the object information by using the attribute information stored in the management information database.

BRIEF DESCRIPTION OF THE DRAWINGS

These and other objects and features of the present invention will become clear from the following description taken in conjunction with the preferred embodiments thereof with reference to the accompanying drawings, in which:

FIG. 5 is an explanatory diagram of a screen for setting a title column according to the embodiment of the present invention;

FIG. 6 is a structural diagram explanatory of a drawing number according to the embodiment of the present invention;

FIG. 7 is an explanatory diagram of an input screen when a number of a child drawing is registered according to the embodiment of the present invention;

FIG. 8 is an explanatory diagram of an input screen when a sheet of drawing illustrating some components, i.e., "SOME COMPONENTS IN ONE SHEET" is registered according to the embodiment of the present invention;

FIG. 9 is an explanatory diagram of an input screen for query conditions in the embodiment of the present invention;

FIG. 10 is an explanatory diagram of a display screen of queried results in the embodiment of the present invention;

FIG. 11A is an explanatory diagram of a display screen of a queried result of a parent-child relationship of drawings in the embodiment;

FIG. 11B is a schematic diagram of the parent-child relationship displayed on the screen of FIG. 11A;

FIG. 12 is an explanatory diagram of a queried screen of a change history in the embodiment of the present invention;

FIG. 13 is an explanatory diagram of a queried screen of "SOME COMPONENTS IN ONE SHEET" in the embodiment of the present invention;

FIG. 14 is an explanatory diagram of a preview screen in the embodiment of the present invention; and FIG. 15 is an explanatory diagram of a queried screen with drawing numbers and special relationship in another embodiment of the present invention.

DETAILED DESCRIPTION OF THE PREFERRED EMBODIMENT

Figure 1:
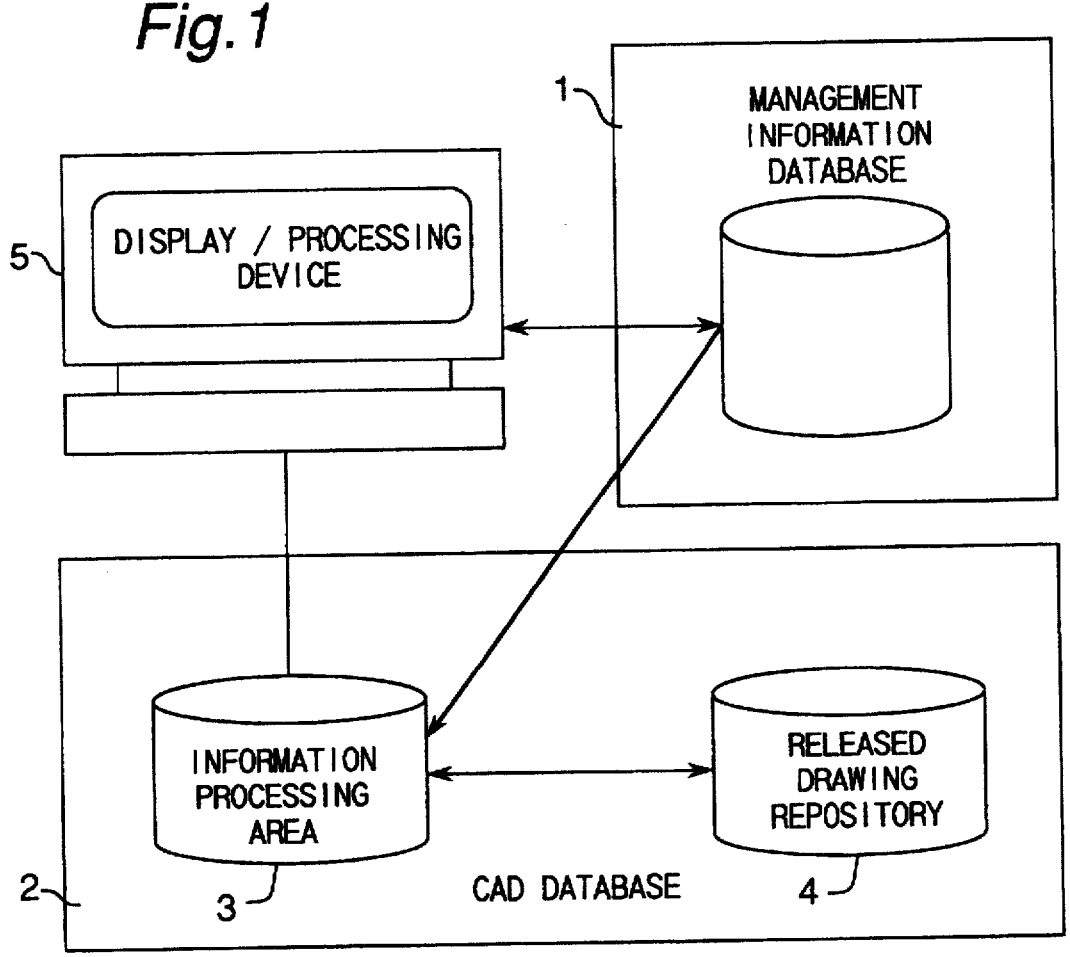
FIG. 1 is a schematic structural diagram of a drawing management system according to a preferred embodiment of the present invention.

Before the description of the present invention proceeds, it is to be noted that like parts are designated by like reference numerals throughout the accompanying drawings.

Preferred embodiments of a drawing management system and method which are applications of an information management system and method of the present invention will be discussed hereinbelow with reference to FIGS. 1–13.

Referring to FIG. 1 schematically showing the total structure of the drawing management system, 1 denotes a management information database for managing attribute information of drawings, 2 denotes a CAD database which comprises an information processing area 3 for making drawings and a released drawing repository 4 for storing released drawings and managing drawings, and 5 denotes a display and processing device, such as a CRT, for processing drawings while displaying drawings and attribute information of the drawings. The display and processing device 5 makes attribute information when making and processing drawings at the information processing area 3, and stores the attribute information in the management information database 1. Drawings stored in the released drawing repository 4 are accessed with the use of the attribute information stored in the database 1.

Figure 2:
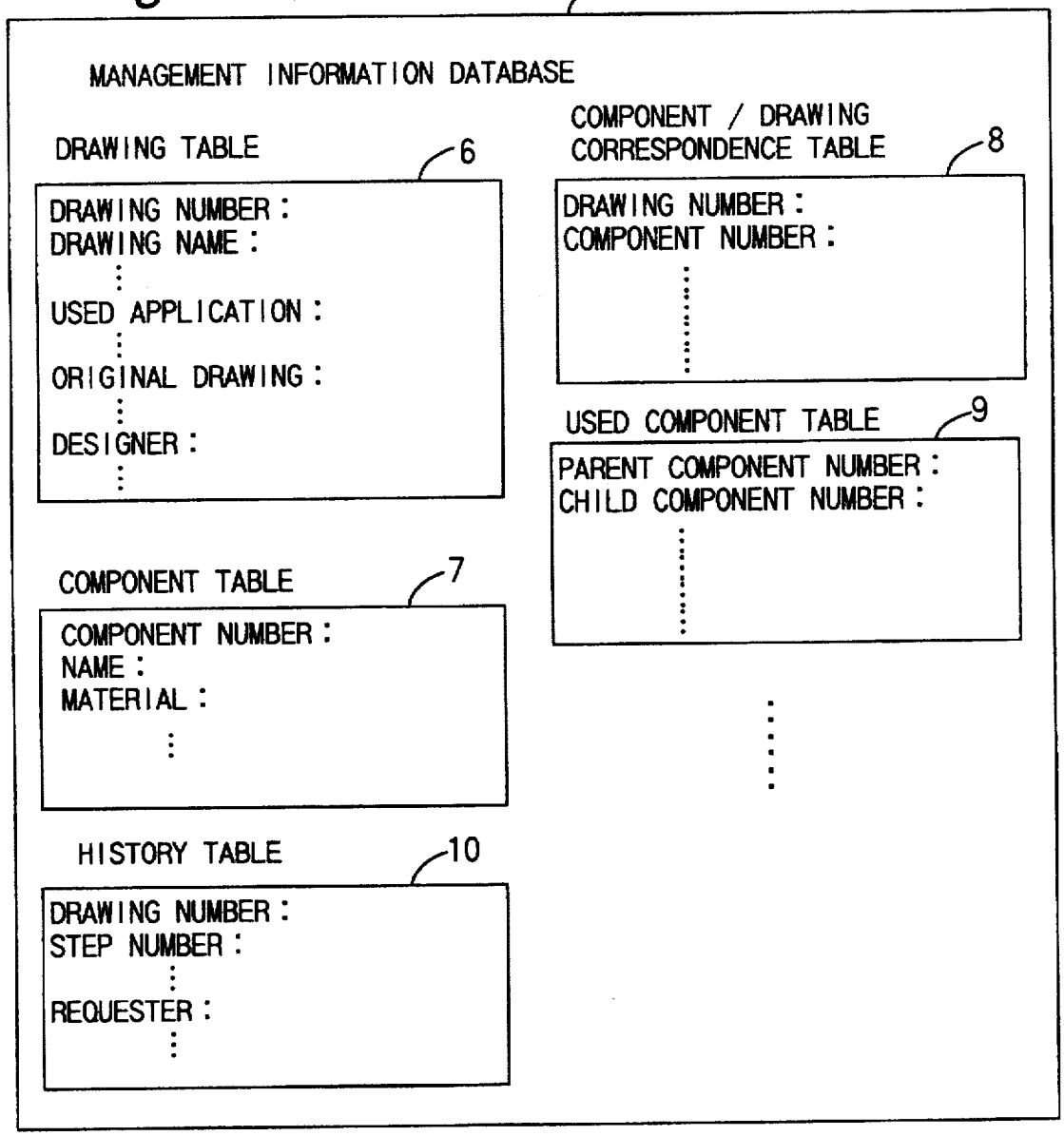
FIG. 2 is an explanatory diagram of a database table of a management information database according to the preferred embodiment of the present invention.

The management information database 1 has, as shown in FIG. 2, a drawing table 6, a component table 7, a component and drawing correspondence table 8, a used component table 9, and a history table 10, etc. The drawing table 6 stores attribute information related to drawings, for example, numbers of drawings, names of drawings, applications used in making drawings, original drawings, designers, and the like when the drawings are obtained by use of design. The component table 7 stores attribute information related to components, e.g., numbers of components, names of components, materials of components. Although a number of a drawing is basically the same as a number of a component, in some cases, some components are illustrated in one sheet of drawing and thus the number of the drawing is not coincident with the numbers of the components. The component table 7 is provided to meet such cases. Correspondences of the numbers of drawings and of components are stored in the correspondence table 8. On the other hand, the used component table 9 stores correspondences of parent and child drawings when a component or product of the parent drawing is composed of components of child drawings. The history table 10 stores history data of drawings, e.g., that the drawings are made and changed, etc.

Figure 3:
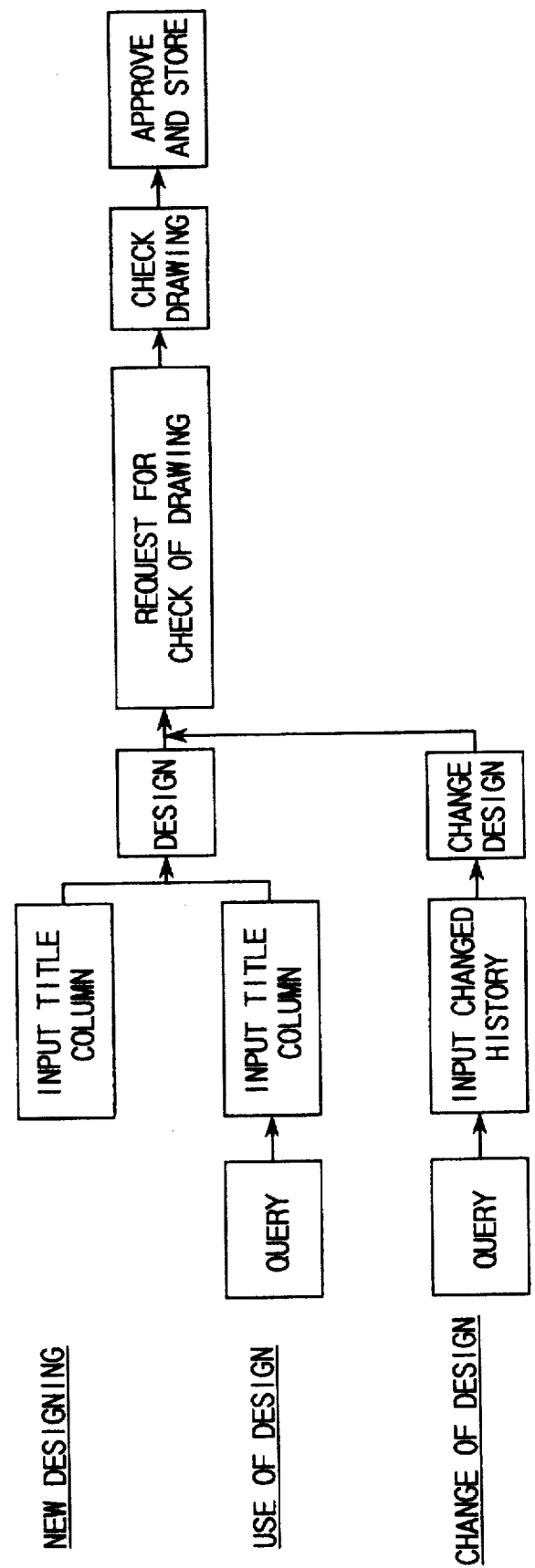
FIG. 3 is a flow chart of a procedure to make a drawing according to the preferred embodiment of the present invention.

Each kind of processes of making a drawing according to the drawing management system will be schematically depicted with reference to FIG. 3. When new designing is to be performed, a drawing frame is called at the display and processing device 5 and various attribute information to be described in a title column of the drawing frame are set and input by the display and processing device 5 in a manner as will be explained later. The set attribute information is stored in the drawing table 6 and also automatically written in the title column by the display and processing device 5. Designing is started after the input operation of the title column is finished. When the designing is completed, drawing check of the design is requested. A drawing checker calls the drawing to be checked and checks the drawing. Then, the drawing checker requests approval of the drawing after checking the drawing. After calling and approving the drawing, an approver registers the drawing in the released drawing repository 4. All history data in the above new designing steps are stored in the history table 10.

In a case where an existing drawing is used to make a drawing for design of a new product, the required drawing is queried from stored drawings by the display and processing device 5 in a manner to be described later, and various attribute information to be described in the title column are set and input newly by the display and processing device 5 in the same manner as above. Subsequently, the target product is designed with the use of the original drawing, which is treated likewise afterwards. In this case of use of the design, attribute information such as a number of the used drawing, etc. are automatically set in an item "ORIGINAL DRAWING" of the drawing table 6.

When the design is changed, the object drawing corresponding to the design is queried. After necessary data are input to an item "CHANGE HISTORY" of the title column by the display and processing device 5, the design is changed while making a drawing and processed in the same manner. Although the item "CHANGE HISTORY" is displayed in FIG. 5, the item may not be displayed except for a case of changing a drawing.

History data in this case are also automatically stored in the history table 10 by the display and processing device 5. During the change of the design, the object drawing in the released drawing repository 4 is kept in a locked state so as to avoid duplicate change of the design.

If there is a need for referring to a drawing, drawings are queried to search for the required drawing by the display and processing device 5.

Figure 4:
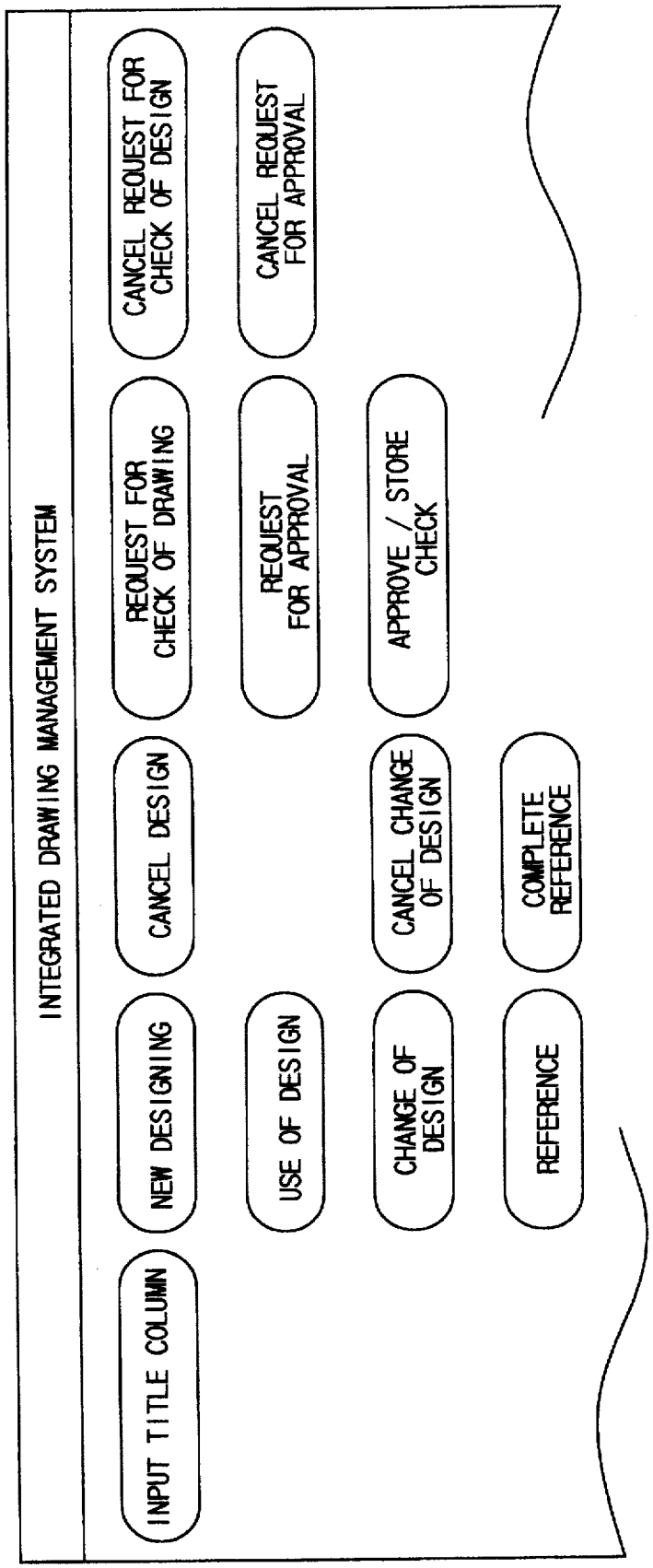
FIG. 4 is an explanatory diagram of an initial screen of a display and processing device in the embodiment of the present invention.

Now, how to manipulate and operate the display and processing device 5 in the foregoing procedures will be described. An initial screen for management of drawings by the display and processing device 5 is set as indicated in FIG. 4. Each required process is executed when a key on the screen corresponding to the process is selected and input through a mouse or the like manner.

In the initial screen of FIG. 4, when a key of "INPUT TITLE COLUMN" is selected, necessary data can be input into the item of "INPUT TITLE COLUMN". When keys of "NEW DESIGNING", "USE OF DESIGN", "CHANGE OF DESIGN", and "REFERENCE" are respectively selected, the corresponding process can be performed. When keys of "CANCEL DESIGN", "CANCEL CHANGE OF DESIGN", and "COMPLETE REFERENCE" are respectively selected, a process for canceling the design operation in the new designing or use of design without storing the made drawing, a process for canceling the design operation in the change of design without storing the made drawing, and a process for completing the reference operation can be performed in correspondence with the keys. In the reference operation, no drawing is changed, made, or stored as new. When keys of "REQUEST FOR CHECK OF DRAWING", "REQUEST FOR APPROVAL", and "APPROVE/STORE" are respectively selected, a process for requesting the check of a drawing to a drawing checker by a draftsman who made the drawing, a process for requesting the approval of a checked drawing to an approver by a drawing checker who checked the drawing, and a process for giving approval to the drawing and then either storing it or returning to the designer or drawing checker etc. by an approver can be performed in correspondence with the keys. In the process for requesting the check of a drawing, the draftsman inputs necessary data such as the name of the draftsman, the drawing date, the name of the drawing checker, and the like through the display and processing device 5. In the process for requesting the approval of a checked drawing, the drawing checker inputs necessary data such as the name of the drawing checker, the checking date, the name of the approver, and the like through the display and processing device 5. In the process for approval and storage the approver inputs necessary data such as the name of the approver, the approving date, and the like. When keys of "CANCEL REQUEST FOR CHECK OF DRAWING" and "CANCEL REQUEST FOR APPROVAL" are respectively selected, a process for canceling the request for the check of a drawing and a process for canceling the request for the approval of a checked drawing are performed in correspondence with the keys.

For example, a setting screen for the title column as in FIG. 5 is displayed when a "NEW DESIGNING" is selected and input, so that a drawing number, a drawing name, a size, a scale, a designer, a designing date, a draftsman, a drawing date, a changed history, a design standard, a material standard, a calculation data, a material, a surface treatment, a process group, etc., namely, attribute information can be set through the display and processing device 5 by an operator. The drawing number is constituted of, for example, as is shown in FIG. 6, a section (1) indicating a code of a working place, etc., a subsection (2) indicating an application code, etc., a class (3) and a subclass (4) indicating functions, etc., a rank (5) indicating dimensions, or an efficiency, etc., a three-digit number (6), (7), and (8) sequentially automatically set from a drawing number register, a history symbol (9) indicative of the fact that a drawing is changed, and a three-digit spare space (10), (11), and (12).

In order to set the drawing number, a selection key for the section is first selected as hatched in FIG. 5, whereby a setting screen for the drawing number, content, and codes of the section are displayed. Upon selection of proper ones, a number corresponding to the section of the drawing number is set. Then, a selection key for the subsection is selected, whereby content and codes of the subsection are displayed. A number corresponding to the subsection is thus selected and set. Similarly, numbers corresponding to the class and subclass are set thereafter. Then, a selection key for dimensions is selected and a proper size is selected from the displayed content, whereby a number corresponding to the proper size is set. The three-digit number is automatically selected in a manner not to be duplicated. The drawing number is set in this manner. Since content of classification codes is sequentially hierarchically displayed at the display and processing device 5 as above, the drawing number is properly and uniformly appointed and the target drawing is accordingly queried without much time consumed for the selection. The corresponding drawing name is automatically set when the drawing number is set. The other attribute information such as a scale, a designer, a draftsman, etc. is sequentially selected, the content of the selected item is displayed and selected through selection keys. Setting of the title column is completed here.

If the drawing is a child drawing showing an element of a component or product drawn on a parent drawing, the parent drawing is queried to call its title column and, a number of the child drawing is registered by a selection key of "REGISTRATION OF CHILD DRAWING NUMBER" in FIG. 5. When the registration key for the child drawing number is manipulated, a screen for registration of the child drawing number as shown in FIG. 7 is displayed. Attribute information such as a required amount (quantity), etc. of the components, or a component and a product of the child drawing number and parent drawing number is input and registered. At the same time, as shown in FIGS. 11A and 11B, all the child drawing numbers related to the parent drawing number are displayed, so that any optional child drawing is selected to be corrected, deleted through a key of "DELETION", or something is added to the drawing through a key of "ADDITION".

If a plurality of components are included in one sheet of drawing, a selection key in FIG. 5, that is, a key "SOME COMPONENTS IN ONE SHEET" is selected to register so. When the "SOME COMPONENTS IN ONE SHEET" key is selected, a registration screen as shown in FIG. 8 is displayed. Drawing numbers corresponding to component numbers are sequentially set in the same manner as above and, attribute information such as a mass, a material, a surface treatment, a process group, etc. of each component is input and registered. Moreover, drawing numbers corresponding to all components included in the parent drawing are also displayed, so that an optional drawing number is selected to correct, delete through a key of "DELETION", and make addition to the drawing through a key "ADDITION".

Attribute information of the drawing is hence stored in the management information database 1 for query.

The operation to query a drawing will now be described below.

When it is selected to perform use of the design, change the design, or refer to the design through the key of "USE OF DESIGN", "CHANGE OF DESIGN" or "REFERENCE" on the initial screen of FIG. 4, a screen to input query conditions is displayed as shown in FIG. 9. In inputting query conditions, a known attribute name is selected, similar to when the title column of FIG. 5 is set, and attribute information selected from the displayed attribute content is input to query the target drawing. For instance, in order to specify a drawing number, the section, subsection, and class are selected and set, then the designer and drawing checker are selected and set, whereby the drawing number is queried with reference to the drawing table 6. In this manner, each name of an attribute of the attribute information is displayed, content of the attribute is displayed by selecting and designating the attribute name, and an attribute information is specified by selecting and designating the content of the attribute. Accordingly, a specific drawing is easily accessed in a short time without referring to a dictionary of codes or the like.

The queried result is displayed as shown in FIG. 10. Drawing numbers falling under the query conditions are listed and displayed together with drawing names. Attribute information of the drawing number is displayed when the drawing number is selected among the listed drawing numbers.

Still referring to FIG. 10, when a "PREVIEW" key is selected and an optional drawing number is selected at this time, a thinned drawing of the selected drawing is displayed. For exerting this function, the present management system is so adapted as to automatically form and store thinned drawings or thinned image information by thinning drawing information before storing the drawings. The thinned drawing or thinned image information is a drawing or data so formed that a drawing or image data is contracted for displaying at a screen to remove the pixels so as to become thin. In other words, the thinned drawing or thinned image information serves as a drawing or data pre-processed for displaying at a screen at high speed so as to omit size reduction processing (thinning operation) of image data for displaying at a screen, and has pixels corresponding to pixels of a drawing displaying region of the screen with a one-to-one correspondence.

If the thinned drawing is displayed when the object drawing is queried by the attribute information, technical content of the drawing, when it is difficult to know from the attribute information alone, can be accurately detected. Moreover, since the thinned drawing contains a relatively small amount of data, little time is consumed to display the thinned drawing of the object drawing. If the drawing numbers are continuously sequentially selected, the thinned drawings of the queried drawings are sequentially displayed, which is convenient to use.

If a "PARENT-CHILD RELATIONSHIP" key is selected on the screen of FIG. 10 and then an optional drawing number is selected, the parent-child relationship of the selected drawing is indicated like a tree by suitably using paragraphs and margins as shown in FIG. 11 with reference to the used component table 9. More specifically, in FIGS. 11A and 11B, ① without margins indicates a parent drawing; ②, ③, and ⑦ each starting the drawing number with one margin at the left head indicate child drawings of the parent drawings ①; ④ and ⑤ each having two margins indicate child drawings of the child drawings ③, while ⑧ and ⑨ each having two margins indicate child drawings of the child drawing ⑦; ⑥ with three margins is a child drawing of the drawing ⑤. When the relationship between a parent component and a child component constituting an element of the parent component, for example the relationship between the parent drawing and the child drawings showing elements constituting a component or product illustrated by the parent drawing is displayed, the structural information of the component or product drawn in the parent drawing can be correctly managed in real time. By a combination of the structural information with the management of drawing numbers by purposes and functions, the component or product is accordingly developed more efficiently, and therefore a developing time is shortened and the number of working steps is reduced.

Figure 14:
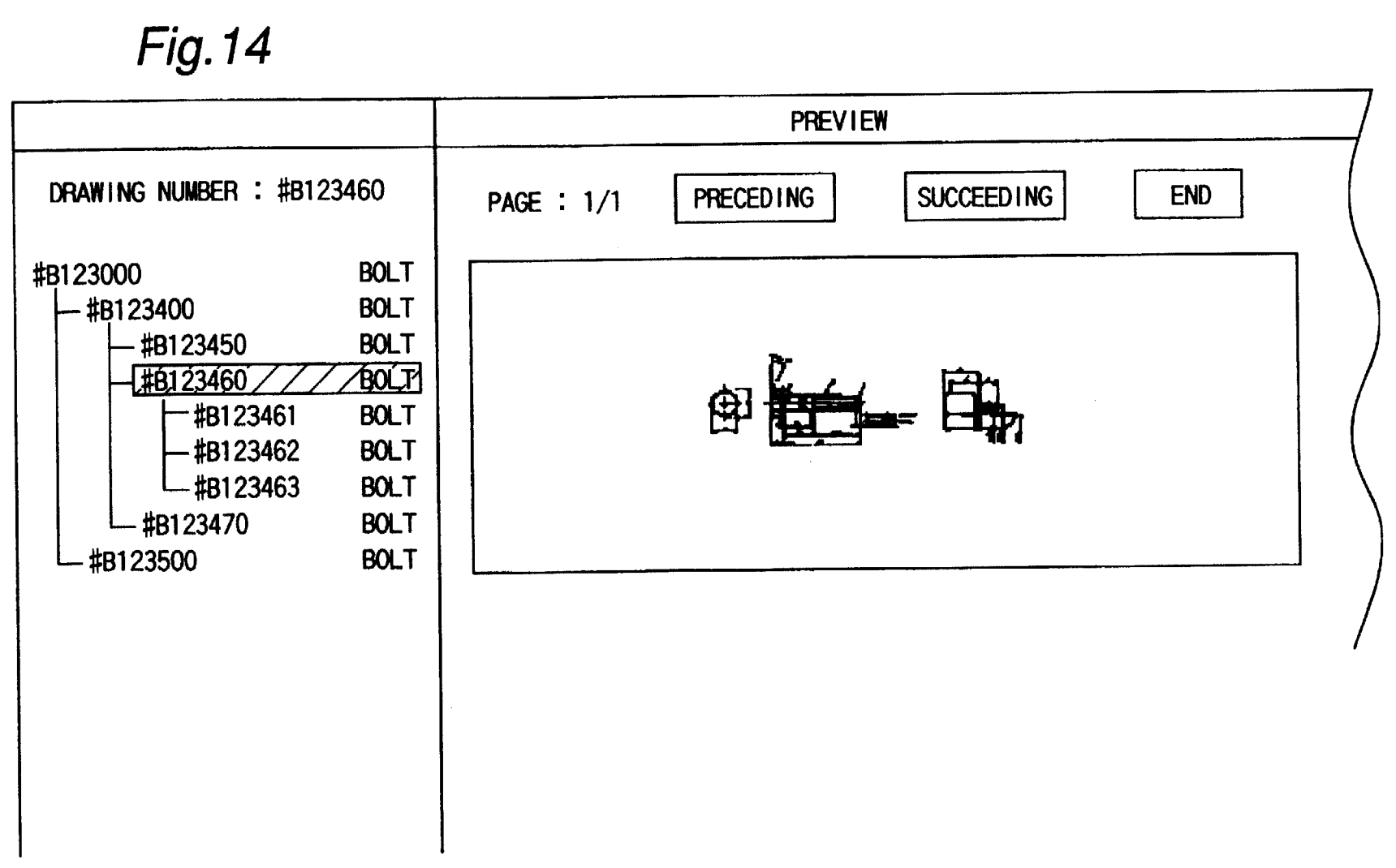

Meanwhile, when a "USE RELATIONSHIP", key is selected and then an optional drawing number is selected, drawings related to the selected drawing are queried in several hierarchical steps, with reference to the item "ORIGINAL DRAWING" of the drawing table 6, both at the side of the original drawing and at the side of the drawing made by using the original drawing. The queried drawings are displayed as shown in the same fashion as in the case of the parent-child relationship of FIG. 11. That is, as shown in FIG. 14, when the drawing number of the queried drawing is #B123460, the drawing numbers at the side of the original drawing, that is, the drawing numbers of the original drawings of the drawing with #B123460 are #B123400 and #B123000. The drawing numbers at the side of the drawing made by using the original drawing, that is, the drawing numbers of the drawings which are made by using the drawing with #B123460 are #B123461, #B123462, and #B123463. The left view of the screen in FIG. 14 shows a preview screen of the drawing with #B123460 as hatched therein. When the drawing has a plurality of pages, a previous page can be displayed by selecting a "PRECEDING" key and a next page can be displayed by selecting a "SUCCEEDING" key. Since a list of related drawings to the original drawing is displayed in the above manner, the drawings which have been made by using the original drawings and might be influenced by changing the design of the original drawings can be easily found, thereby to correctly detect a range influenced by the change of the design, etc. This is particularly useful to prevent troubles in the quality of design when the design is changed, etc.

When a "CHANGE HISTORY" key is selected and then an optional drawing number is selected, the history table 10 is referred to, and details of the change history of the drawing are displayed as in FIG. 12. That is, when a "PRECEDING" key, a "SUCCEEDING" key, or a "LATEST HISTORY" key is suitably selected, a corrector, a correcting date, a correction reason, etc. are displayed for every time of correction, whereby the history of the drawing is detected in detail.

When a "SOME COMPONENTS IN ONE SHEET" key is selected in FIG. 10 and then an optional drawing number is selected, while the component and drawing correspondence table 8 and the component table 7 are made reference to, a list of components illustrated on the drawing is displayed as shown in FIG. 13. When an optional component is selected from the list, details of the component are indicated. Since the drawings and components are managed in association with each other, the history of components such as change of the design of components, etc. can be controlled even when some components are illustrated in one sheet of drawing.

When a "RE-QUERY" key is selected in FIG. 10, the queried result is queried again with queried condition(s) newly inputted. This re-query operation may be carried out while displaying the queried result on the screen. Instead of using this "RE-QUERY" key, the query operation may be carried out again with condition(s) to be queried changed, for example, after a "CANCEL OF QUERY" key is provided and selected and the former to-be-queried conditions are displayed.

FIG. 15 is an explanatory diagram of a queried screen with drawing numbers and special relationship in another embodiment of the present invention. In FIG. 15, when the drawing number of #B123460 is designated and a "SPECIAL RELATIONSHIP" key is selected in the list of queried drawing of FIG. 10, a screen for displaying a special relationship is overlapped on the screen of the list of queried drawing. When an "ORIGINAL DRAWING FOR USE" key is selected in the screen of the special relationship, the drawing number of the original drawing of the designated drawing which was used in making the designated drawing is displayed. When an "ORIGINAL DRAWING FOR REFERENCE" key is selected in the screen of the special relationship, the drawing number of the original drawing of the designated drawing which was referred to in making the designated drawing is displayed. When a "DIFFERENT COLOR" key is selected in the screen of the special relationship, the drawing number of a drawing which color of a component or product in the drawing is different from that of a component or product in the designated drawing is displayed. In FIG. 15, the "ORIGINAL DRAWING FOR USE" key is selected as hatched and the drawing number #B123400 of the original drawing of the designated drawing #B123460 which was used in making the designated drawing is displayed.

According to the above embodiment of the present invention, since attribute information stored in the management information database 1 is utilized for query of data by the display and processing device 5, drawings stored in the released drawing repository 4 of the CAD database 2 can be easily accessed, and therefore efficiently processed, e.g., efficiently perform the process for using the existing drawing to make a drawing, the process for changing the design of a product to make a drawing while using the existing drawing of the product, the process for querying the drawing, or the process for referring to a drawing of an existing product, etc.

The management information database 1 is provided with the history table 10 which stores information related to the advancement of drawings, i.e., how much or to what degree the drawings are made at the information processing area 3. The history table 10 makes it possible to detect the progress of drawings, accordingly allowing simultaneous designing by a plurality of designers easily. The time required for designing is shortened and the number of developing and controlling steps is reduced.

Although the foregoing embodiment is directed to an example of management of drawings, the invention is suitably applicable to management of other various kinds of information of a large quantity of data to frequently perform a process for making new data, a process for using existing data to make new data, a process for changing existing data to make new data while using existing data, a process for querying data, or a process for referring to existing data, etc.

According to the information management system and method of the present invention, object information is made and processed at the processing area of the object information database by the display and processing device which carries out processing while displaying information, and at the same time, its attribute information is made and stored in the management information database. Therefore, the object information stored in the storing area can be easily accessed with the use of the attribute information stored in the management information database, so that information is newly made, used to make another information, changed to make another information, queried, referred to, etc. with ease.

When information is adapted to be stored and queried by displaying and selecting an attribute name of the attribute information, then displaying content of the attribute of the attribute name thereby to specify the attribute information, it becomes unnecessary to refer to a dictionary of codes or the like, and thus the specific information is easily accessed in a short time.

Further, when object information is a drawing, drawing numbers are assigned by hierarchical classification codes such as a section, a subsection, a class, a subclass, etc. on the basis of purposes or functions as attribute information, and content of the classification codes is sequentially displayed hierarchically by the display and processing device to select and query the drawing. The drawing numbers are properly and uniformly used without much trouble.

Since thinned drawings or thinned image information are made by thinning drawing information before drawings are stored, and the thinned drawings are displayed at the query time by the attribute information, technical content of the target drawing can be accurately detected. It is convenient that the target drawing can be quickly displayed and queried in less time because of a relatively small amount of data of thinned drawings.

When the attribute information includes information indicating a usage relationship between an existing drawing and a new drawing which has been made by using the existing drawing, in a case where when the existing drawing is changed in design, drawing(s) which might be influenced by changing the design of the drawing can be easily found. That is, a range influenced by changing the design of the existing drawing etc. can be easily and accurately found to prevent any trouble in the design quality.

The storing area for storing information related to the advancement in making of drawings at the processing area is provided in the management information database, allowing a plurality of designers to design at the same time with ease, whereby the designing time is shortened and the number of development and management steps can be decreased.

When the storing area for storing information related to the relationship between a parent component and a child component constituting an element of the parent component is provided in the management information database, the structural information of products or components can be managed correctly in real time. Since a developing process for products or components becomes efficient in a combination of the structural information with the management of information by purposes and functions, the developing time can be shortened and the number of developing steps can be reduced.

When the drawing table, the component table, and the table indicating the correspondence between drawings and components are provided in the management information database, drawings can be managed correspondingly to the components. Therefore, the history of each component, e.g., design change or the like can be managed even when some components are drawn on one sheet of drawing.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An information management system comprising:
    a management information database for managing attribute information of object information;
    an object information database having an information processing area and an information storing area for managing the object information, the object information being a drawing having a drawing number as attribute information, the drawing number including hierarchical classification codes having a section, a subsection, a class, and a subclass classified based on purposes and functions, the section being a hierarchically higher level than the subsection, the subsection being a hierarchically higher level than the class, and the class being a hierarchically higher level than the subclass, the subclass having attribute information of the class, the class having attribute information of the subsection, and the subsection having attribute information of the section; and
    a display and processing device for processing the object information while displaying the information,
    wherein the attribute information of the object information is made and stored in the management information database when the object information is made and processed at the information processing area, so that the object information is accessed by using the attribute information stored in the management information database;
    the display and processing device is adapted to display attribute names of the attribute information, select and designate one of the attribute names of the attribute information to display content of the attribute information having the designated attribute name so as to store and query the object information; and
    the drawing number is appointed for the drawing by the display and processing device and the drawing is queried by sequentially displaying and selecting content of the classification codes hierarchically at the display and processing device.

2. The information management system according to claim 1, wherein the object information database stores a thinned drawing or thinned image information which is made by thinning image information of the drawing so that the thinned drawing or thinned image information is displayed when the drawing is queried by the attribute information.

3. The information management system according to claim 2, wherein the display and processing device includes a screen and the thinned drawing or thinned image information is so formed that one sheet of the drawing is accommodated within the screen and the thinned drawing or thinned image information includes pixels which are displayed in a one-to-one correspondence to pixels of the screen of the display and processing device.

4. The information management system according to claim 1, wherein the attribute information includes information related to a usage relationship between a drawing made by using a stored drawing and the used drawing.

5. The information management system according to claim 1, wherein the management information database comprises an area for storing information related to a state of progress in making of the drawing in the information processing area.

6. The information management system according to claim 1, wherein the management information database comprises an area for storing information related to a parent-child relationship between a parent drawing component and a child drawing component constituting an element of the parent drawing component.

7. An information management system according to claim 1, wherein the management information database comprises a table of drawings for storing drawings of components, a table of components for storing information of components, and a table showing correspondence between the drawings and the information of the components.

8. An information management method which is used in an information management system comprising:
    a management information database for managing attribute information of object information;
    an object information database having an information processing area and an information storing area for managing the object information, the object information being a drawing having, as attribute information, the drawing number including hierarchical classification codes having a section, a subsection, a class, and a subclass classified based on purposes and functions, the section being a hierarchically higher level than the subsection, the subsection being a hierarchically higher level than the class, and the class being a hierarchically higher level than the subclass, the subclass having attribute information of the class, the class having attribute information of the subsection, and the subsection having attribute information of the section; and
    a display and processing device for processing the object information while displaying the information,
said method comprising the steps of:
    making and processing the object information at the information processing area;
    making the attribute information of the object information and storing the attribute information in the management information database at the making and processing step;
    accessing the object information by using the attribute information stored in the management information database;
    displaying attribute names of the attribute information;
    selecting and designating one attribute name from the displayed attribute names;
    displaying content of the attribute information having the selected and designated attribute name;
    selecting and designating desired information in the displayed content;

storing or querying the selected and designated information;

sequentially displaying and selecting content of the hierarchical classification codes at the display and processing device;

appointing the drawing number to the drawing; and querying the drawing.

9. The information management method according to claim 8, further comprising the steps of:

thinning image information of the drawing to form a thinned drawing or thinned image information;

storing the thinned drawing or thinned image information; and displaying the stored thinned drawing or thinned image information when the stored drawing is queried by the attribute information.

10. The information management method according to claim 9, wherein the display and processing device includes a screen and in the step of thinning the image information of the drawing, the thinned drawing or thinned image information is so formed that one sheet of the drawing is accommodated within the screen and the thinned drawing or thinned image information includes pixels which are displayed in a one-to-one correspondence to pixels of the screen of the display and processing device.

11. The information management method according to claim 8, wherein the attribute information includes information related to a usage relationship between a drawing made by using a stored drawing and the used drawing.

12. The information management method according to claim 8, further comprising a step of storing information related to a state of progress in making of the drawing in the information processing area into an area of the management information database.

13. The information management method according to claim 8, further comprising a step of storing information related to a parent-child relationship between a parent drawing component and a child drawing component constituting an element of the parent drawing component into an area of the management information database.

14. The information management method according to claim 8, where in the storing step, drawings of components are stored in a table of drawings, information of components is stored in a table of components, and correspondence between the drawings and the information of the components is stored in a table of correspondence in the management information database.

* * * * *